May 23, 1950  C. F. SCHAEFER  2,508,623
TRUE AIR SPEED METER

Filed Jan. 12, 1946  4 Sheets-Sheet 1

Inventor
Carl F. Schaefer
By:- Moore, Olson & Trexler
attys

May 23, 1950 C. F. SCHAEFER 2,508,623
TRUE AIR SPEED METER
Filed Jan. 12, 1946 4 Sheets-Sheet 2
Fig. 3.
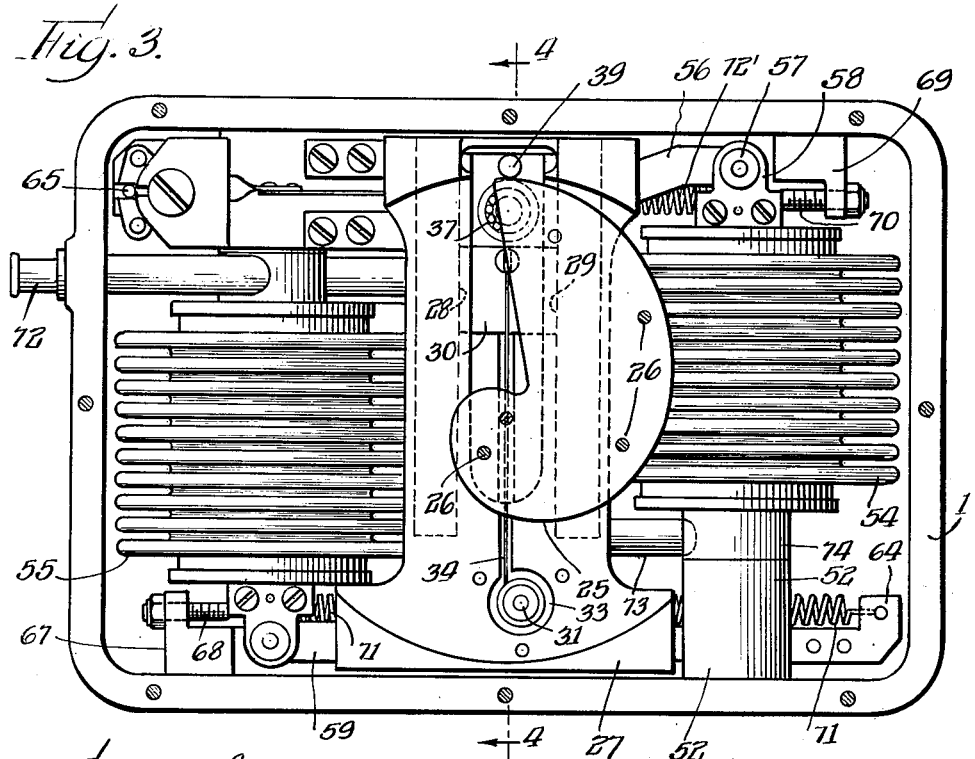
Fig. 4.
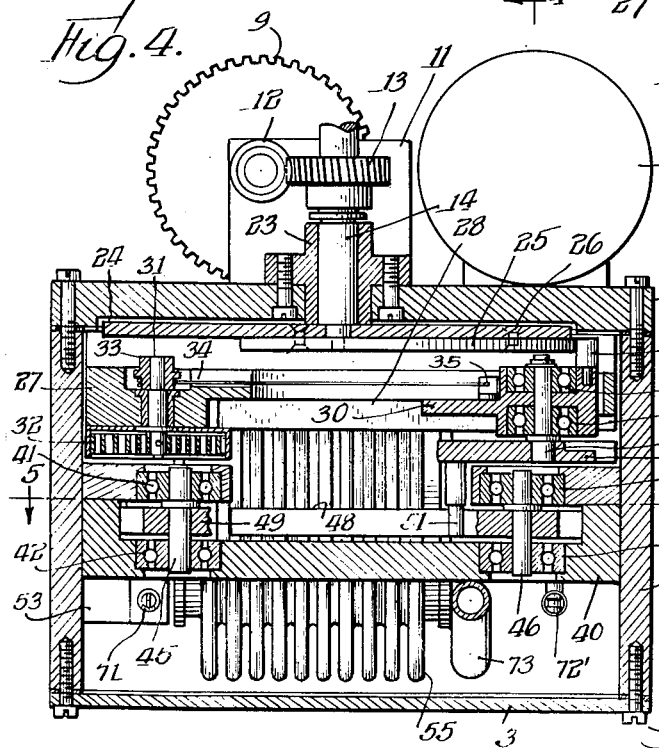
Fig. 8.
Inventor
Carl F. Schaefer
By: Moore, Olson & Trexler
Attys.

May 23, 1950  C. F. SCHAEFER  2,508,623
TRUE AIR SPEED METER
Filed Jan. 12, 1946  4 Sheets-Sheet 3

Inventor
Carl F. Schaefer
By:- Moore, Olson & Trexler
attys.

May 23, 1950  C. F. SCHAEFER  2,508,623
TRUE AIR SPEED METER

Filed Jan. 12, 1946  4 Sheets-Sheet 4

INVENTOR.
CARL F. SCHAEFER
BY
Henry L. Shenier
ATTORNEY

Patented May 23, 1950

2,508,623

UNITED STATES PATENT OFFICE 2,508,623

TRUE AIR-SPEED METER

Carl F. Schaefer, Port Washington, N. Y., assignor to The Norden Laboratories Corporation, New York, N. Y., a corporation of Connecticut Application January 12, 1946, Serial No. 640,915

9 Claims. (Cl. 73—182)

My invention relates to true air speed meters, and more particularly to a device capable of ascertaining the true speed of an airplane relative to the air through which it is passing.

In aviation the need for an instrument to indicate the speed at which the airplane is traveling through the air was early recognized. Among the first instruments used was a diaphragm or bellows and Pitot tube. The faster the airplane traveled through the air, the greater was the pressure generated in the Pitot tube and it was thought that the calibration of a pressure responsive device would give true air speed. It was soon found, however, that inasmuch as air is a compressible medium, its density would vary not only as a function of speed but also as a function of altitude and temperature and would vary further in accordance with the barometric pressure. As a result, inaccuracies were introduced which gave erroneous indications of speed.

It was then suggested that a pair of pressure responsive devices such as Sylphon bellows be used. One of the bellows was to be influenced by the pressure in the Pitot tube. The other of the bellows was to be influenced by pressure generated by a motor-driven air pump. As soon as the pressure of the motor driven air pump equalled the pressure generated in the Pitot tube, a switch would be actuated to open the motor circuit. In this manner, inaccuracies introduced by variations in density either due to the compressibility of the air, the altitude, the temperature, or the barometric pressure, would be automatically cancelled and the instantaneous speed of the pump would be a function of the true air speed. This system, however, has some disadvantages. The instantaneous speed of the pump varies from the average speed by as much as plus or minus three to four miles per hour within a period of 1 to 1.2 seconds. If the pump speed is used to obtain the air speed vector for a computing device in which air speed is one of the factors, there must be an averaging to eliminate the effects of speed variations. The use of an averaging device would introduce a delay in measuring genuine changes in air speed which would occur during maneuvers such as in a gliding approach. Furthermore, if the pump speed is to be used as the air speed input to a computer, it must be placed physically close to it, thus limiting the flexibility of design of the computer.

Then, too, in many cases it is necessary to operate controls as a function of air speed. Where the indicating means is dynamic, it is difficult to operate means for taking power from the system.

One object of my invention is to provide a true air speed meter in which inaccuracies due to density differences are eliminated.

Another object of my invention is to provide a true air speed meter in which the instantaneous speed of the plane will always be accurately indicated, thus enabling my device to be used with a computer without an averaging device.

Another object of my invention is to provide a true air speed meter adapted to be used in connection with a power take-off means for operating controls and the like.

Other and further objects of my invention will appear from the following description.

In general, my invention contemplates the provision of a pair of pressure responsive devices, one of which is responsive to the pressure in a Pitot tube, and the other of which is responsive to the pressure generated by an air pump. The air pump, however, is driven at a constant speed so that there will be no variations in motor speed which introduce inaccuracies between the average speed of the motor and the actual instantaneous speed of the airplane through the air. The pressure responsive devices actuate a differential linkage. Means are provided for varying the effect of the pressure generated by the Pitot tube with respect to the effect of the pressure generated by the air pump. The position of the means for causing a variation in respective effects of Pitot pressure and pump pressure is used to indicate the true air speed.

In the accompanying drawings, which form part of the instant specification and which are to be read in conjunction therewith, and in which like reference numerals are used to indicate like parts in various views:

Fig. 3 is a sectional view taken on the line 3—3 of Fig. 2.

Fig. 4 is a sectional view taken on the line 4—4 of Fig. 3.

Fig. 8 is a diagrammatic view showing the air pump.

Figure 1:
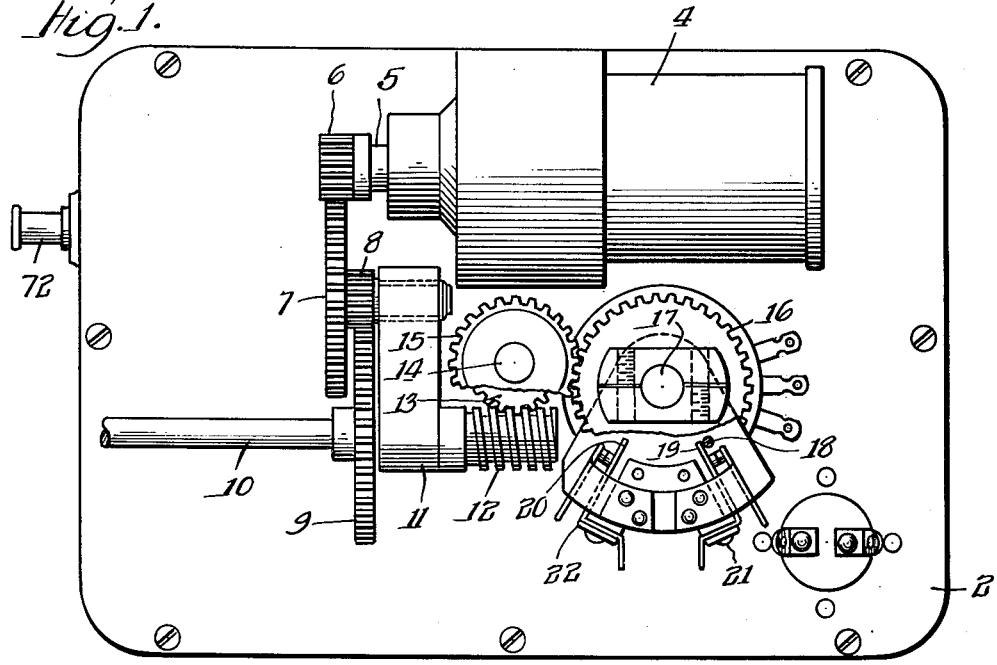
Fig. 1 is a top plan view of a device showing one embodiment of my invention.
Figure 2:
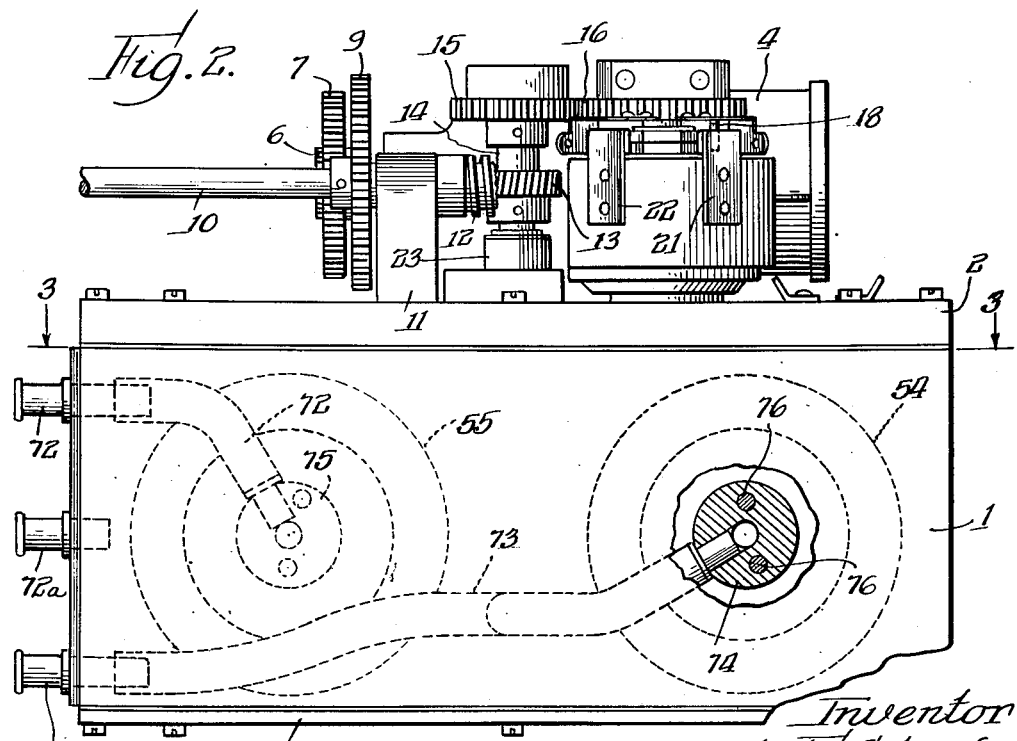
Fig. 2 is a front elevation of the device shown in Fig. 1, with parts broken away.
Figure 5:
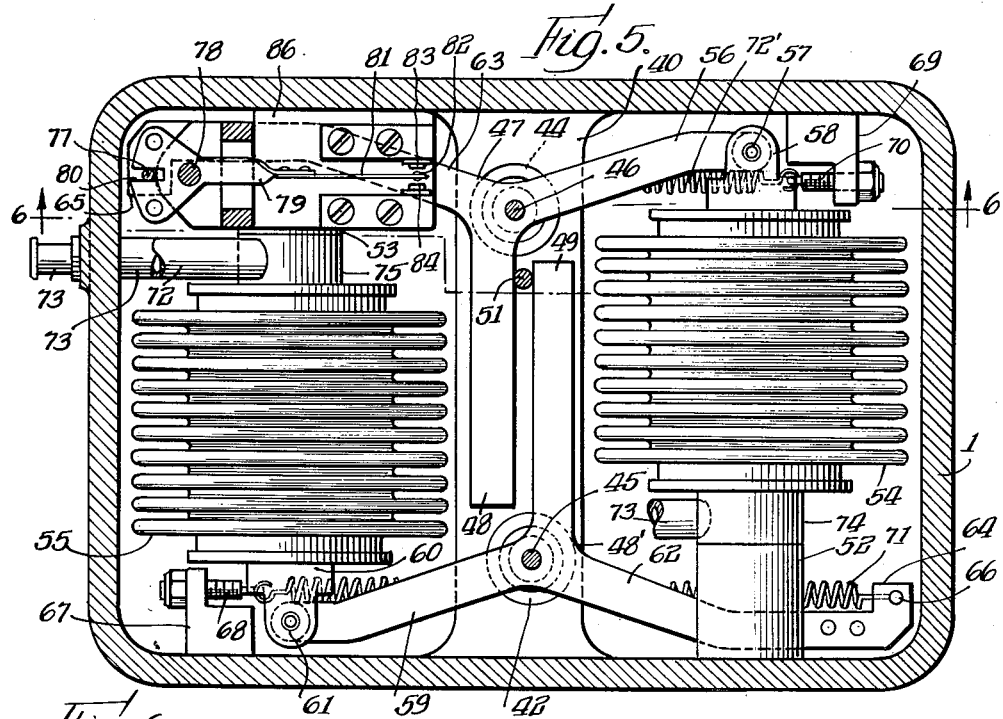
Fig. 5 is a sectional view taken on the line 5—5 of Fig. 4.

More particularly, referring now to the drawings, a housing 1 is provided with a top plate 2 and a bottom plate 3. A motor 4 having a shaft 5 is mounted on the top plate. To the motor shaft 5 is fastened a pinion 6. The pinion 6 meshes with an idler gear 7 which drives a pinion 8 which is in driving engagement with a gear 9 fixedly mounted on a shaft 10. The shaft 10 rotates in a suitable bearing in bracket 11 and carries a worm 12 which engages a worm wheel 13. The worm wheel 13 is secured to a shaft 14 to which is also secured a gear 15. The gear 15 meshes with a gear 16 which is secured to a shaft 17. The gear 16 carries a pin 18 adapted alternately to engage arms 19 and 20 of the limit switches 21 and 22. The shaft 14 extends through a bearing 23 mounted in the top cover 2 as can readily be seen by reference to Fig. 4. Secured to the shaft 14 is a disk 24 to which is fastened a cam 25 by means of rivets 26. A member 27 is formed with a pair of guides 28 and 29, along which a follower block 30 is adapted to slide. A shaft 31 is journaled in one end of the guide member 27. The inner end of the shaft 31 carries a spiral spring 32 adapted, when wound, to rotate the shaft 31. A drum 33 is secured to the other end of the shaft 31 for rotation therewith. A flexible wire 34 is wound around the drum 33. The other end of the wire 34 is secured to the follower block 30 by lug 35. The follower block carries bearings 36 and 37 in which is journaled a shaft 38. A follower pin 39 is secured to the follower block and held firmly against the cam 25 through the action of the wire 34 and the spring 32. A bracket 40 cooperates with the guide member 27 in supporting bearings 41, 42, 43 and 44. A shaft 45 is journaled in bearings 41 and 42 and a shaft 46 is journaled in bearings 43 and 44. A double bell crank lever 47, which can best be seen by reference to Fig. 5, is secured to shaft 46, while a similar bell crank lever 48' is secured to shaft 45. The bell crank lever 47 has one arm 48 extending substantially parallel to and adjacent an arm 49 of the bell crank lever 48'. Carried by the follower block 30, by means of shaft 38, is an arm 50 which carries a pin 51. The pin 51 for movement therewith is lodged between arms 48 and 49 of the bell crank levers 47 and 48'. Mounted on suitable supports 52 and 53 within the housing 1, I provide a pair of Sylphon bellows 54 and 55. The bell crank lever 47 has an arm 56, the end of which is pivotally secured by bearing 57 to a bracket 58 carried by the bellows 54. Similarly, the bell crank lever 48' has an arm 59 pivotally secured to a bracket 60 by means of a bearing 61. The bracket 60 is carried by the bellows 55 so that movement of bellows will be transmitted to the arm 59, while movement of bellows 54 will be transmitted to the arm 56 through the bracket 58. Due to the fact that the bellows is metal, it has a resistance to movement in either direction from its relaxed position. In order to counterbalance the resistance to movement of the metal of the Sylphon bellows, I provide an arm 62 on the bell crank lever 48' and an arm 63 on the bell crank lever 47.

Referring now to Fig. 5, it will be seen that the arm 62 is provided with a lug 64 while the arm 63 is provided with a lug 65. The lug 64 carries a pin 66. A bracket 67 is secured to the housing 1 and carries an adjusting screw 68.

A bracket 69 is similarly affixed to the housing 1 and carries an adjusting screw 70. Extending between the adjusting screw 68 and the pin 66, I provide a spring 71. Extending between the adjusting screw 70 and the lug 65 I provide a spring 72'. Tension of the spring 71 can be varied by the screw 68, while the tension of the spring 62 can be adjusted by the screw 70. In the position of parts shown in Fig. 5, the spring tension of spring 71 tends to rotate the bell crank lever 48' in a clockwise direction, while the expansion of bellows 55 tends to rotate the bell crank lever 48' in a counter-clockwise direction.

Figure 10:
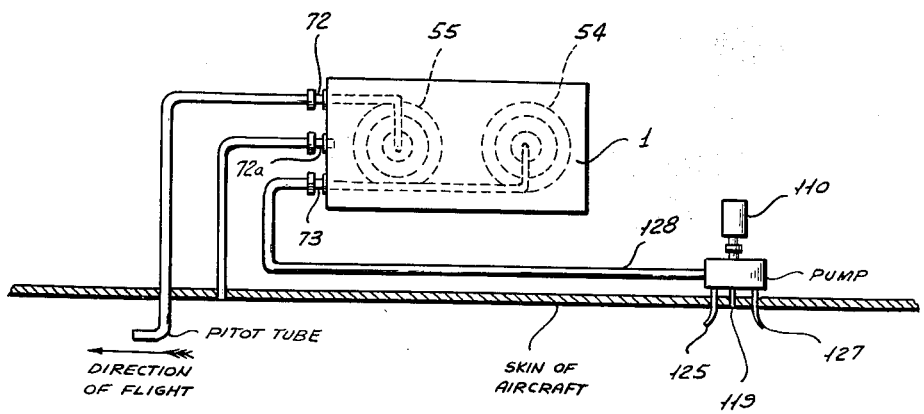
Fig. 10 is a diagrammatic view showing the mode of installing my air speed meter in an aircraft.

In its normal position each of the bellows is compressed from its relaxed position. The moment due to the resistance to compression of the bellows is balanced by the moment due to the spring tension. As the bellows moves outwardly the resisting force of the bellows is reduced, reducing the moment due to the bellows. At the same time the turning moment due to spring tension is reduced by the shortening of the lever arm through which the spring tension acts. The effect of the increase in length of the spring is small compared with the effect of the shorter arm so that there is a net decrease in moment caused by the spring. The rate of decrease in moment with change in bellows extension due to bellows stiffness is equal to the rate of decrease in moment due to spring tension at the normal operating point thus allowing the pressure within the bellows to act irrespective of the stiffness of the metal of the bellows. The interior of one of the bellows 55 is placed in communication with a Pitot tube through pipe 72. The other of the bellows 54 is placed in communication with an air pump driven at a constant speed by a motor through a pipe 73. The interior of housing 1 is placed in communication with the external atmosphere through a pipe as shown in Fig. 10 communicating with pipe 72a. The air pump may be of any suitable design such as a disk with a radial hole acting as a small centrifugal pump. It is important that the air being compressed by the air pump is at the same temperature as the outside air. This may be accomplished very simply by providing a cooling jacket circulating outside air around the air pump housing.

The air pump arrangement is shown diagrammatically in Fig. 8, to which reference is now had. A motor 110 drives a shaft 111 at a constant speed. A pump housing 112 is provided with a cooling jacket 113. The pump rotor 114 comprises a disk having a radially extending bore 115. The shaft 111 is provided with an axial bore 116 which communicates with the bore 115. The shaft 111 terminates in a flange 117 cooperating with a stationary coupling member 118. A pipe 119 places coupling 118 in communication with the external atmosphere through the skin of the airplane 120. A stuffing box 121 and a stuffing box 122 seal the pump shaft 111. The pump housing 112 is fitted with a plurality of fins 123 for heat exchange purposes. A pipe 124 provided with an external scoop 125 picks up air and delivers it to the cooling jacket 113. Exhaust air leaves the cooling jacket through pipe 126 and discharges through exit scoop 127. The air passing through bore 116 is thrown out by centrifugal force through bore 115 and is compressed. The compressed air is discharged from the pump through pipe 128, whence it goes to pipe 73 for delivery to the bellows 54. The pipes 72 and 73 are connected to the interior of the respective Sylphon bellows 55 and 54 adjacent the supports for the bellows 53 and 52, there being connection manifolds 74 and 75 provided. The bellows are attached to the supports by means of screws 76.

Figure 6:
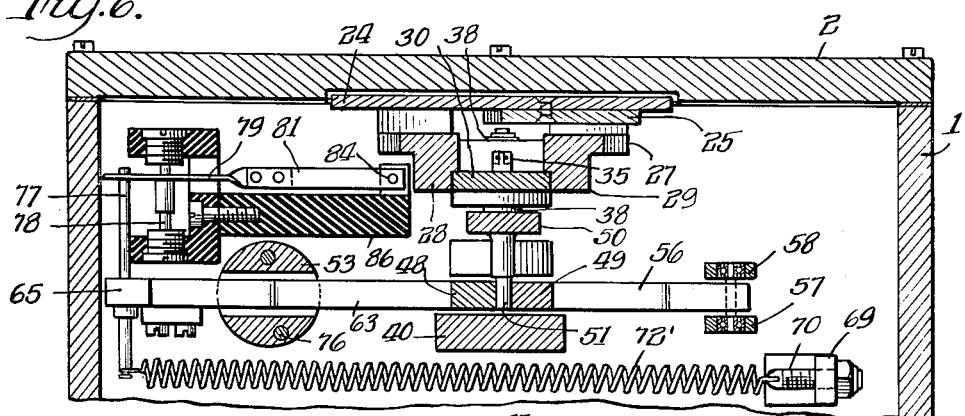
Fig. 6 is a sectional view taken on the line 6—6 of Fig. 5.

Referring now to Figs. 5 and 6, it will be observed that there is a pin 77 carried by the lug 65 of the arm 63 of the bell crank lever 47. Mounted on a pivot pin 79 I provide a lever 79. One end of the lever is provided with a slot 80 in which the pin 77 is lodged. To the other end of the lever 79 there is secured a contact arm 81 which carries a contact point 82 adapted to contact alternately contact point 83 and contact point 84.

Figure 7:
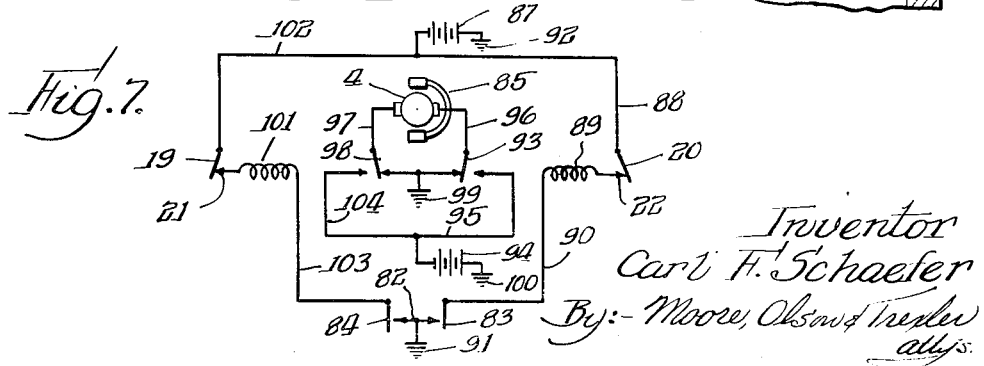
Fig. 7 is a diagrammatic view showing the electrical connections used in the embodiment as shown in the figures.
Figure 9:
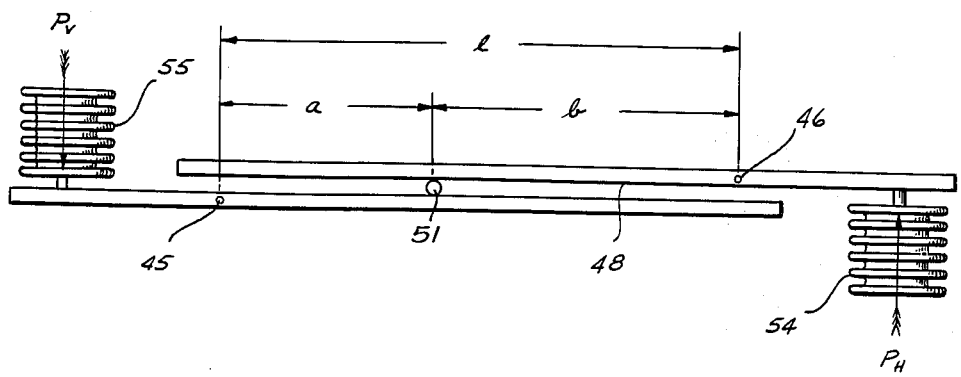
Fig. 9 is a diagrammatic view showing the relationship of parts embodied in my invention.

Referring now to Fig. 7, there is shown diagrammatically the electrical connections used in my device. The motor 4 has a uni-directional field produced by the magnet 85. The contact points 83 and 84 are carried by a block of insulating material 86. When the lug 65 on the end of arm 63 moves downwardly as viewed in Fig. 5, it carries the pin 77 downwardly. This moves the slotted end of the lever 78 downwardly and the contact arm 81 upwardly, permitting contact point 82 to make contact with contact point 83. When this occurs current will flow from the battery 87, through conductor 88, through switch 22, through the winding 89 of a relay, through conductor 90, through contact point 83, thence through contact point 82, thence to ground 91, the circuit being completed through ground 92 to the other side of the battery 87. The energization of the winding 89 of the relay attracts armature 93, completing the circuit from the battery 94, through conductor 95, through the armature 93, through conductor 96, through the motor winding of motor 4, through conductor 97, through the armature 98, to ground 99, and thence to the other side of the battery through ground 100. The motor being energized will operate the gear train described above. Should the limit of motion desired be passed, the pin 18 will move the arm 20, opening the switch 22, thus de-energizing the winding 89 of the relay and permitting armature 93 to break the motor circuit. When contact point 82 makes contact with contact point 84, the winding 101 of the opposite relay will be energized, current flowing from the battery 87 through conductor 102, through winding 101, through conductor 103, to ground 91, and thence to ground 92. The energization of winding 101 will attract armature 98 of the relay, completing the circuit from the battery 94, through conductor 104, through armature 98, through conductor 97, through the winding of the motor 4, through conductor 96, through armature 93, to ground 99, and thence to ground 100. Since the armature current of motor 4 will now flow in a direction opposite to that which it took when relay winding 89 was energized, and the field of the motor is in the same direction, the motor will rotate in the opposite direction. In this case, the limit of motion is circumscribed when the pin 18 contacts the arm 19 of the switch 21 to break the circuit through the relay winding 101.

In operation, let us assume the airplane is flying at a given altitude. The pressure generated in the Pitot tube communicates with the interior of the bellows 55. This tends to cause the bellows to move downwardly as viewed in Figs. 3 and 5, rotating or tending to cause the bell crank lever 48' to rotate in a counter-clockwise direction. At the same time the pump which is driven by a motor at a constant speed develops a pressure which communicates through pipe 73 to the interior of Sylphon bellows 54, tending to cause this bellows to expand. This tends to rotate the bell crank lever 47 in a counter-clockwise direction, as viewed in Figs. 3 and 5. The pin 51 is interposed between the arms 48 and 49, and determines the relative length of the lever arm of application of the respective forces generated through bellows 54 and 55. Let us now assume, with the parts shown in the position in Fig. 5, that the airplane lessens its air speed. The pressure generated within the Pitot tube will drop and hence the pressure within the bellows 55 is lowered. Since the motor speed which drives the air pump is constant, its pressure will exert a force against pin 51 such that the bell crank lever 48' will rotate in a clockwise direction. This will permit the bell crank lever 47 to rotate in a counter-clockwise direction, moving the pin 77 downwardly and causing contact to be made between contact point 82 and contact point 83. This will rotate the motor to move the cam 25 as viewed in Fig. 3 in a counter-clockwise direction, causing the pin 51 to move downwardly. As the pin moves downwardly, the effective length of the lever arm 48 becomes greater and the effective length of the lever arm 49 becomes shorter. This increases the mechanical advantage exercised by the lower pressure within the bellows 55 until a state of equilibrium is again reached. When this occurs, the bell crank lever 47 has rotated in a clockwise direction to break the circuit of the relay, thus stopping the motor in a position of equilibrium. Should the plane now move to a higher air speed, the pressure within the bellows 55 will cause the bell crank lever 48' to rotate in a counter-clockwise direction, rotating the bell crank lever 47 in a clockwise direction, causing contact point 82 to make contact with contact point 84, moving the cam 25 in a clockwise direction, thus raising the fulcrum pin 51 until the mechanical advantage of the pressure within the bellows 55 is decreased to a point where equilibrium is again achieved.

It will be observed that the position of fulcrum pin 51, which is governed by the position of the cam, which is governed in turn by the position of the shaft 10, is a function of air speed. In this manner I may operate controls directly from the shaft 10. Similarly, the output of shaft 10 may be used as the true air speed input to a computer without the use of averaging equipment. The position of shaft 10 will at all times show true air speed.

In the foregoing construction let $P_V$ be the Pitot pressure above static and
$P_H$ be the pump pressure above static.

Let the effective lever arm from the fulcrum 45 of the arm 49 to pin 51 be $a$, and the effective lever arm from the fulcrum 46 of the arm 48 to pin 51 be $b$, then (1) $$\frac{P_V}{P_H} = \frac{a}{b}$$

but $$\frac{P_V}{P_H} = \frac{V_a^2 \left(1 + \frac{1}{4} \frac{V_a^2}{C^2}\right)}{2K}$$

where $V_a$ = air speed in knots
$C$ = velocity of sound which is a function of temperature K is determined by setting $a/b$ at 100 knots equal to $b/a$ at 400 knots, thus allowing the indicator a 100–400 knot range with equal limits for $a$ and $b$.

The relation between the position of the fulcrum pin, air speed, and pressure is therefore $$(2) \quad \frac{a}{1} = \frac{V_v^2(4C^2+V_v^2)}{483000C^2+V_v^2(4C^2+V_v^2)} = \frac{P_V}{P_V+P_H}$$

where $1=a+b$.

The value of C used in the calibration is that which makes the meter correct at all altitudes for an indicated air speed of 250 knots in a standard atmosphere.

Where $a$ is different from $b$, when $P_V$ is equal to $P_H$, we have a case in which the bellows are different. In such case Equation 1 becomes $$\frac{P_V}{kP_H} = \frac{a}{b}$$

in which $k$ is the constant of correction for the bellows difference.

It will be seen that I have accomplished the objects of my invention. It will be observed that I have provided a true air speed indicator which will at all times show the instantaneous value of true air speed within the limits of the instrument and hence may be used as the air speed vector for a computer without the use of an averaging equipment. Since the pump pressure above static is proportional to the density and the Pitot pressure is proportional to density times a function of air speed, the ratio of the two bellows forces is a function of air speed. The balancing of one force against another by means of a servomotor shaft permits me to use the output shaft displacement to obtain a function of true air speed. Since the only connections from the pump to the system are a pressure tube and a power connection, the pump may be placed remote from the computer. I have eliminated the necessity of varying pump pressure and the pump runs at a constant speed. Because of this, a single pump may be used since any variation in pump pressure at a given speed or from one pump to another in event of replacement of pumps can be corrected by adjusting the speed at which the pump is to run. Similarly, differences in bellows can be compensated simply by adjusting the constant speed at which the pump is to be driven.

It will be understood that certain features and sub-combinations are of utility and may be employed without reference to other features and sub-combinations. This is contemplated by and is within the scope of the claims. It is further obvious that various changes may be made in details within the scope of the claims without departing from the spirit of the invention. It is, therefore, to be understood that this invention is not to be limited to the specific details shown and described.

Having thus described my invention, I claim:

1. A true air speed meter, including in combination, a first pressure responsive means, a second pressure responsive means, a Pitot tube, means providing communication between said Pitot tube and said first pressure responsive means, an air pump driven at constant speed, means providing communication between the discharge of said air pump and said second pressure responsive means, lever means actuated by said first pressure responsive means, lever means actuated by said second pressure responsive means, means positioned between the lever means for transmitting thrust therebetween, means for varying the relative position between the thrust transmitting means and said lever means to balance the thrust between said lever means, and means responsive to said last named means positioned in accordance with true air speed.

2. A true air speed meter, including in combination, a first bellows, a Pitot tube, means providing communication between said Pitot tube and said first bellows, a second bellows, an air pump driven at constant speed, means providing communication between the discharge of the air pump and the second bellows, a lever, means for actuating said lever from said first bellows, a second lever, means for actuating said lever from said second bellows, movable means transmitting thrust between the levers, and means for moving said movable means longitudinally of said levers to balance the thrust therebetween.

3. A true air speed meter, including in combination, a first bellows, a Pitot tube, means for providing communication between said Pitot tube and said first bellows, a second bellows, an air pump driven at a constant speed, means for providing communication between the discharge of said air pump and said second bellows, a first lever adapted to be rotated by said first bellows, a second lever adapted to be rotated by the second bellows, adjustable means for transmitting thrust between the levers, spring means for biasing the resistance to movement of the material of said bellows, and means for moving said adjustable means longitudinally of said levers to balance the thrust therebetween.

4. A true air speed meter, including in combination, a first bellows, a Pitot tube, means providing communication between said Pitot tube and said first bellows, a second bellows, an air pump driven at a constant speed, means providing communication between the discharge of said air pump and said second bellows, a lever, means for actuating said lever from said first bellows, a second lever, means for actuating said second lever from said second bellows, movable means transmitting thrust between said levers, means for moving said movable means, and means responsive to the movement of one of said levers for moving the movable means longitudinally of said levers to balance the thrust therebetween.

5. A true air speed meter as in claim 4 in which said means for moving said movable means comprises an electric motor.

6. An air speed meter as in claim 4 in which said means for moving said movable means comprises an electric motor and said means responsive to movement of one of said levers includes a switch for controlling the rotation of said motor and its direction.

7. A true air speed meter, including in combination a first bellows, a Pitot tube, means providing communication between said Pitot tube and said first bellows, a second bellows, an air pump driven at a constant speed, means providing communication between the discharge of said air pump and said second bellows, a lever, means for actuating said lever from said first bellows, a second lever, means for actuating said second lever from said second bellows, movable means transmitting thrust between said levers, means responsive to the movement of one of said levers for controlling said movable means to balance the thrust between the levers, and means actuated by said responsive means for rendering said responsive means inoperative when said movable means has been moved to a predetermined limit.

8. A true air speed meter as in claim 3, including means for adjusting the tension of said spring means.

9. A true air speed meter, including in combination a first bellows, a Pitot tube, means providing communication between said Pitot tube and said first bellows, a second bellows, an air pump driven at a constant speed, means providing communication between the discharge of said air pump and said second bellows, a lever, means for actuating said lever from said first bellows, a second lever, means for actuating said second lever from said second bellows, movable means adapted to transmit thrust between said levers, an electric motor, means responsive to movement of one of said levers for controlling said electric motor, a cam, means for driving said cam from said electric motor, and a follower for said cam adapted to move said movable thrust transmitting means whereby to vary the mechanical advantage of said levers.

CARL F. SCHAEFER.

REFERENCES CITED

The following references are of record in the file of this patent:

UNITED STATES PATENTS

| Number    | Name       | Date          |
|-----------|------------|---------------|
| 1,128,297 | Cummings   | Feb. 16, 1915 |
| 1,451,064 | Dunajeff   | Aug. 10, 1923 |
| 2,023,568 | Albersheim | Dec. 10, 1935 |
| 2,269,068 | Corbin     | Jan. 6, 1942  |
| 2,441,381 | Anderson   | May 11, 1948  |
| 2,454,007 | Reilly et al. | Nov. 16, 1948 |

FOREIGN PATENTS

| Number  | Country       | Date          |
|---------|---------------|---------------|
| 27,770  | Great Britain | Dec. 2, 1913  |
| 179,903 | Great Britain | Feb. 15, 1923 |
| 435,142 | Great Britain | June 15, 1936 |